United States Patent
Terwilliger et al.

(10) Patent No.: US 12,173,651 B2
(45) Date of Patent: Dec. 24, 2024

(54) PRESSURE CONTROL FOR BIFURCATED FLOW OF A TURBINE ENGINE

(71) Applicant: Raytheon Technologies Corporation, Farmington, CT (US)

(72) Inventors: Neil J. Terwilliger, Cheshire, CT (US); Simon W. Evans, Farmington, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/197,558

(22) Filed: May 15, 2023

(65) Prior Publication Data

US 2024/0384684 A1 Nov. 21, 2024

(51) Int. Cl.
| | | |
|---|---|---|
| *F02C 7/042* | (2006.01) | |
| *F02C 7/141* | (2006.01) | |
| *F02C 7/18* | (2006.01) | |
| *F02K 1/06* | (2006.01) | |
| *F02K 3/077* | (2006.01) | |
| *F02C 7/04* | (2006.01) | |
| *F02K 3/06* | (2006.01) | |

(52) U.S. Cl.
CPC .............. *F02C 7/042* (2013.01); *F02C 7/141* (2013.01); *F02C 7/185* (2013.01); *F02K 1/06* (2013.01); *F02K 3/077* (2013.01); *F02C 7/04* (2013.01); *F02K 3/06* (2013.01)

(58) Field of Classification Search
CPC .. F02K 3/077; F02C 7/14; F02C 7/141; F02C 7/18; F02C 7/185
See application file for complete search history.

(56) References Cited

U.S. PATENT DOCUMENTS

| | | | | |
|---|---|---|---|---|
| 3,623,328 A | * | 11/1971 | Pike | F02C 7/045 60/216 |
| 3,946,554 A | * | 3/1976 | Neumann | F04D 27/0246 415/162 |
| 4,254,618 A | * | 3/1981 | Elovic | F02C 7/185 60/39.83 |
| 5,269,135 A | * | 12/1993 | Vermejan | F02C 7/04 60/266 |
| 7,500,352 B2 | * | 3/2009 | Bradbrook | F01D 5/022 415/77 |
| 11,174,816 B2 | | 11/2021 | Banham | |
| 11,725,526 B1 | * | 8/2023 | Sibbach | F02C 7/04 415/191 |
| 11,867,121 B2 | * | 1/2024 | Vitt | F02C 7/16 |

(Continued)

*Primary Examiner* — William H Rodriguez
(74) *Attorney, Agent, or Firm* — Getz Balich LLC (57) ABSTRACT

A propulsion system is provided for an aircraft. This propulsion system includes a turbine engine, and the turbine engine includes a propulsor rotor, an engine core and a heat exchanger. The propulsor rotor is configured to rotate about an axis and direct a first air stream along a primary flowpath that bypasses the engine core. The propulsor rotor is configured to direct a second air stream along a secondary flowpath with a geometry extending at least eighty degrees about the axis. The turbine engine is configured such that the first air stream enters the primary flowpath at a first pressure and the second air stream enters the secondary flowpath at a second pressure that is different than the first pressure. The engine core is configured to drive rotation of the propulsor rotor. The heat exchanger is disposed within the secondary flowpath.

16 Claims, 12 Drawing Sheets

(56) References Cited

U.S. PATENT DOCUMENTS

| | | | |
|---|---|---|---|
| 2005/0008482 A1* | 1/2005 | Allford | F01D 25/02 415/175 |
| 2006/0016172 A1* | 1/2006 | Bradbrook | F02K 3/065 60/226.1 |
| 2010/0278642 A1* | 11/2010 | Olver | F01D 25/18 415/180 |
| 2010/0303616 A1* | 12/2010 | Chir | F02C 6/08 415/178 |
| 2012/0117940 A1* | 5/2012 | Winter | F02C 7/32 60/226.3 |
| 2012/0198816 A1* | 8/2012 | Suciu | B64D 27/40 60/226.3 |
| 2012/0272658 A1* | 11/2012 | Murphy | F02C 7/185 165/96 |
| 2013/0008170 A1* | 1/2013 | Gallagher | F01D 5/141 416/223 R |
| 2013/0098050 A1* | 4/2013 | Kupratis | F02K 3/075 60/772 |
| 2013/0145744 A1* | 6/2013 | Lo | F01D 17/105 60/226.3 |
| 2013/0149111 A1* | 6/2013 | Kohlenberg | F02K 1/30 415/122.1 |
| 2013/0149112 A1* | 6/2013 | Kohlenberg | F02K 1/72 415/122.1 |
| 2013/0236296 A1* | 9/2013 | Collopy | F02C 9/20 415/162 |
| 2015/0132106 A1* | 5/2015 | Smith | F04D 29/563 415/108 |
| 2015/0361819 A1* | 12/2015 | Epstein | F01D 1/023 415/208.1 |
| 2016/0003153 A1* | 1/2016 | Rhoden | F02K 3/04 60/730 |
| 2016/0177828 A1* | 6/2016 | Snyder | F02K 3/077 415/144 |
| 2016/0312703 A1* | 10/2016 | Ribarov | F02C 7/222 |
| 2016/0369697 A1 | 12/2016 | Schwarz | |
| 2016/0369706 A1* | 12/2016 | Suciu | F02C 9/18 |
| 2018/0363554 A1* | 12/2018 | Kroger | F02C 3/04 |
| 2019/0024989 A1* | 1/2019 | Wilson | F28F 9/0214 |
| 2019/0128189 A1* | 5/2019 | Rambo | F02K 3/115 |
| 2019/0218971 A1* | 7/2019 | Niergarth | F02C 9/18 |
| 2020/0248620 A1* | 8/2020 | Zysman | F02C 9/18 |
| 2020/0271060 A1* | 8/2020 | Hall | F01D 17/162 |
| 2020/0332717 A1* | 10/2020 | Rambo | F02K 3/075 |
| 2020/0332718 A1* | 10/2020 | Rambo | F02C 7/18 |
| 2021/0071581 A1* | 3/2021 | Sodaro | F02C 7/06 |
| 2021/0222624 A1* | 7/2021 | Wiedenhoefer | F02K 3/105 |
| 2021/0285375 A1* | 9/2021 | Wiedenhoefer | F02C 7/18 |
| 2022/0275757 A1* | 9/2022 | Rambo | F01D 25/12 |
| 2022/0282670 A1 | 9/2022 | Niergarth | |
| 2022/0403780 A1* | 12/2022 | Price | F02C 7/14 |
| 2023/0028503 A1* | 1/2023 | Sibbach | F02K 3/06 |
| 2023/0090415 A1* | 3/2023 | Miller | F02C 9/18 60/782 |
| 2023/0117984 A1* | 4/2023 | Niergarth | F02C 7/185 415/177 |
| 2023/0235700 A1* | 7/2023 | Smout | F02C 7/14 60/266 |
| 2023/0265764 A1* | 8/2023 | Johnson | F01D 5/03 60/782 |
| 2023/0265862 A1* | 8/2023 | Sibbach | F01D 25/24 415/208.2 |
| 2024/0003294 A1* | 1/2024 | Sibbach | B64D 33/02 |

* cited by examiner

PRESSURE CONTROL FOR BIFURCATED FLOW OF A TURBINE ENGINE

GOVERNMENT LICENSE RIGHTS

This invention was made with Government support under Contract DE-AR0001561 awarded by the United States Department of Energy, Office of ARPA-E. The Government has certain rights in the invention.

BACKGROUND OF THE DISCLOSURE

1. Technical Field

This disclosure relates generally to a turbine engine and, more particularly, to arranging a heat exchanger within the turbine engine.

2. Background Information

A gas turbine engine may include one or more heat exchangers for cooling various working fluids. Various heat exchanger arrangements and locations are known in the art. While these known heat exchanger arrangements and locations have various benefits, there is still room in the art for improvement.

SUMMARY OF THE DISCLOSURE

According to an aspect of the present disclosure, a propulsion system is provided for an aircraft. This propulsion system includes a turbine engine, and the turbine engine includes a propulsor rotor, an engine core and a heat exchanger. The propulsor rotor is configured to rotate about an axis and direct a first air stream along a primary flowpath that bypasses the engine core. The propulsor rotor is configured to direct a second air stream along a secondary flowpath with a geometry extending at least eighty degrees about the axis. The turbine engine is configured such that the first air stream enters the primary flowpath at a first pressure and the second air stream enters the secondary flowpath at a second pressure that is different than the first pressure. The engine core is configured to drive rotation of the propulsor rotor. The heat exchanger is disposed within the secondary flowpath.

According to another aspect of the present disclosure, another propulsion system is provided for an aircraft. This propulsion system includes a turbine engine, and the turbine engine includes a propulsor rotor, a variable area nozzle, an engine core and a heat exchanger. The propulsor rotor is configured to direct a first air stream along a primary flowpath that bypasses the engine core. The propulsor rotor is configured to direct a second air stream along a secondary flowpath that bypasses the engine core. The secondary flowpath extends in the turbine engine to the variable area nozzle. The variable area nozzle is configured to change a pressure ratio between a first pressure of the first air stream entering the primary flowpath to a second pressure of the second air stream entering the secondary flowpath. The turbine engine is configured to drive rotation of the propulsor rotor. The heat exchanger is disposed within the secondary flowpath upstream of the variable area nozzle.

According to still another aspect of the present disclosure, another propulsion system is provided for an aircraft. This propulsion system includes a turbine engine, and the turbine engine includes a propulsor rotor, a variable vane arrangement, an engine core and a heat exchanger. The propulsor rotor is configured to direct a first air stream along a primary flowpath that bypasses the engine core. The propulsor rotor is configured to direct a second air stream along a secondary flowpath that bypasses the engine core. The variable vane arrangement is configured to change a pressure ratio between a first pressure of the first air stream entering the primary flowpath to a second pressure of the second air stream entering the secondary flowpath. The turbine engine is configured to drive rotation of the propulsor rotor. The heat exchanger is disposed within the secondary flowpath.

The secondary flowpath may bypass the engine core.

An entrance to the primary flowpath and an entrance to the secondary flowpath may be axially aligned along the axis.

The primary flowpath and the secondary flowpath may each extend in the turbine engine.

The primary flowpath may extend outside of the turbine engine. The secondary flowpath may extend in the turbine engine.

The secondary flowpath may be radially outboard of and extend circumferentially about the primary flowpath.

The primary flowpath may be radially outboard of and extend circumferentially about the secondary flowpath.

The second pressure may be greater than the first pressure.

The turbine engine may be configured such that the first air stream enters the primary flowpath at a first velocity and the second air stream enters the secondary flowpath at a second velocity that is greater than the first velocity.

A first radial portion of the propulsor rotor may be configured to provide a first pressure ratio across the propulsor rotor. The first radial portion of the propulsor rotor may be configured to direct the first air stream into the primary flowpath. A second radial portion of the propulsor rotor may be configured to provide a second pressure ratio across the propulsor rotor that is different than the first pressure ratio. The second radial portion of the propulsor rotor may be configured to direct the second air stream into the secondary flowpath.

The turbine engine may also include a variable area nozzle. The secondary flowpath may extend in the turbine engine to the variable area nozzle. Movement of the variable area nozzle may change a ratio between the first pressure and the second pressure.

The turbine engine may also include a plurality of guide vanes arranged circumferentially about the axis in an array. The guide vanes may be upstream of the propulsor rotor. The guide vanes may be configured to guide air to at least a radial portion of the propulsor rotor that directs the second air stream into the secondary flowpath.

A first of the guide vanes may have a vane span. The propulsor rotor may include a propulsor blade with a blade span that is at least two times larger than the vane span.

The guide vanes may also be configured to guide the air to a radial portion of the propulsor rotor that directs the first air stream into the primary flowpath.

A first of the guide vanes may be a first variable vane. Movement of the first variable vane may change a ratio between the first pressure and the second pressure.

The turbine engine may also include a plurality of guide vanes arranged circumferentially about the axis in an array. The guide vanes may be downstream of the propulsor rotor. The guide vanes may be configured to guide the first air stream into the primary flowpath. The guide vanes may be configured to guide the second air stream into the secondary flowpath.

A first of the guide vanes may be a first variable vane. Movement of the first variable vane may change a ratio between the first pressure and the second pressure.

The turbine engine may also include a plurality of guide vanes arranged circumferentially about the axis in an array. The guide vanes may be disposed within the secondary flowpath upstream of the heat exchanger.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
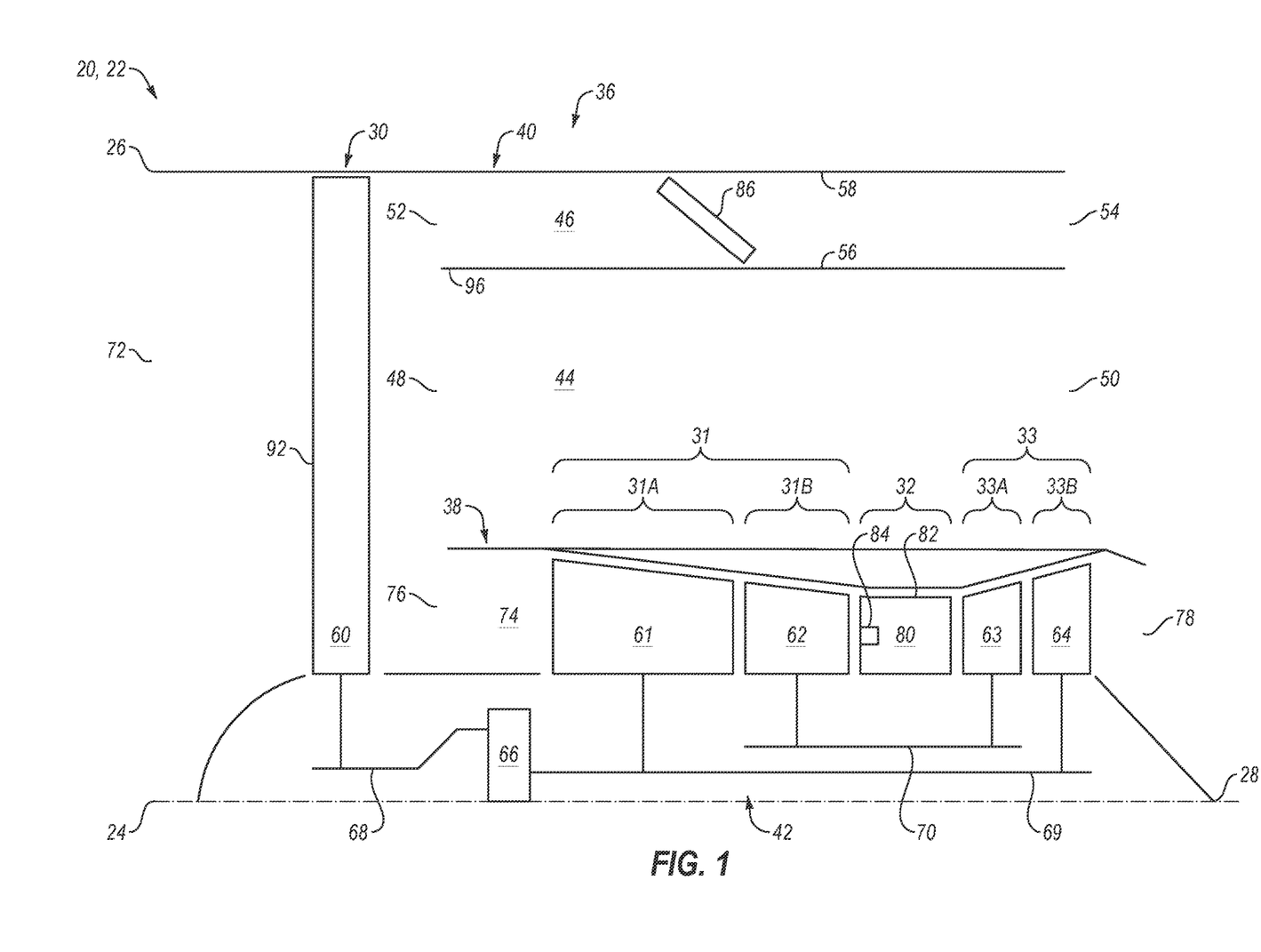
FIG. 1 is a partial schematic illustration of a propulsion system for an aircraft.

FIG. 1 illustrates a propulsion system 20 for an aircraft. The aircraft may be an airplane, a drone (e.g., an unmanned aerial vehicle (UAV)) or any other manned or unmanned aerial vehicle. The aircraft propulsion system 20 of FIG. 1 includes a gas turbine engine 22 such as, but not limited to, a turbofan engine.

The turbine engine 22 extends axially along a centerline axis 24 between a forward, upstream end 26 of the turbine engine 22 and an aft, downstream end 28 of the turbine engine 22. The turbine engine 22 includes a fan section 30, a compressor section 31, a combustor section 32 and a turbine section 33. The compressor section 31 of FIG. 1 includes a low pressure compressor (LPC) section 31A and a high pressure compressor (HPC) section 31B. The turbine section 33 of FIG. 1 includes a high pressure turbine (HPT) section 33A and a low pressure turbine (LPT) section 33B.

The engine sections 30-33B of FIG. 1 are arranged sequentially along the centerline axis 24 within an engine housing 36. This engine housing 36 includes an inner housing structure 38 ("inner structure") and an outer housing structure 40 ("outer structure"). The inner structure 38 and/or the outer structure 40 may each include one or more engine cases and/or a nacelle structure, which nacelle structure may provide an aerodynamic covering for/over the respective engine case(s). Briefly, the inner structure 38 of FIG. 1 houses one or more of the engine sections 31A-33B, which engine sections 31A-33B may form/are included in a core 42 of the turbine engine 22. The outer structure 40 of FIG. 1 houses at least the fan section 30. This outer structure 40 is also disposed radially outboard of, extends circumferentially about (e.g., circumscribes) and extends axially along (e.g., overlaps) at least a forward portion of the inner structure 38.

The engine housing 36 may provide the aircraft propulsion system 20 with a bifurcated (e.g., bypass) flow. The engine housing 36 of FIG. 1, for example, at least partially or completely forms a primary flowpath 44 and a secondary flowpath 46 of the aircraft propulsion system 20 and its turbine engine 22. The primary flowpath 44 may be configured as an inner bypass flowpath. The secondary flowpath 46 may be configured as an outer bypass flowpath disposed radially outboard of the primary flowpath 44. The present disclosure, however, is not limited to such an exemplary primary and secondary flowpath arrangement as described below in further detail.

The primary flowpath 44 of FIG. 1 is disposed radially outboard of and is configured to bypass the (e.g., entire) engine core 42. This primary flowpath 44, for example, extends axially along the centerline axis 24 within the engine housing 36 from a forward, upstream inlet 48 (e.g., an entrance) into the primary flowpath 44 to an aft, downstream exhaust 50 from the primary flowpath 44. The primary flowpath 44 extends radially within the engine housing 36 from the inner structure 38 to the outer structure 40. The primary flowpath 44 may thereby be formed by and radially between the inner structure 38 and the outer structure 40. The primary flowpath 44 extends circumferentially within the engine housing 36 about (e.g., completely around) the centerline axis 24. With such an arrangement, the primary flowpath 44 may have a full-hoop (e.g., annular) geometry. The primary flowpath 44, of course, may (or may not) be circumferentially interrupted by one or more vanes, one or more struts, one or more bifurcations and/or one or more other such structures extending between the inner structure 38 and the outer structure 40.

The secondary flowpath 46 of FIG. 1 is disposed radially outboard of and is configured to bypass the (e.g., entire) engine core 42. The secondary flowpath 46 of FIG. 1 is also configured to bypass at least a portion or an entirety of the primary flowpath 44. This secondary flowpath 46, for example, extends axially along the centerline axis 24 within the engine housing 36 from a forward, upstream inlet 52 (e.g., an entrance) into the secondary flowpath 46 to an aft, downstream exhaust 54 from the secondary flowpath 46. The secondary flowpath inlet 52 may be axially aligned with the primary flowpath inlet 48 along the centerline axis 24. The secondary flowpath exhaust 54 may be axially aligned with (or alternatively forward or aft of) the primary flowpath exhaust 50 along the centerline axis 24. The secondary flowpath 46 extends radially within the outer structure 40. The secondary flowpath 46 of FIG. 1, for example, extends radially from a duct inner wall 56 of the outer structure 40 to a duct outer wall 58 of the outer structure 40. The secondary flowpath 46 extends circumferentially within the outer structure 40 about (e.g., completely around) the centerline axis 24. With such an arrangement, the secondary flowpath 46 may have a full-hoop (e.g., annular) geometry. The secondary flowpath 46, of course, may (or may not) be circumferentially interrupted by one or more vanes, one or more struts, one or more bifurcations and/or one or more other such structures extending between the inner wall 56 and the outer wall 58. Alternatively, the secondary flowpath 46 may extend circumferentially within the outer structure 40 partially about the centerline axis 24, for example at least eighty degrees (80°). For example, the secondary flowpath 46 may extend between one-hundred degrees (100°) and one-hundred and twenty degrees (120°), or between one-hundred degrees and twenty (120°) and one-hundred and seventy degrees (170°). With such an arrangement, the outer structure 40 may include multiple of the secondary flowpaths 46 arranged about the centerline axis 24.

Each of the engine sections 30, 31A, 31B, 33A and 33B includes a respective bladed rotor 60-64. Each of these bladed rotors 60-64 includes a plurality of rotor blades arranged circumferentially around and connected to one or more respective rotor disks and/or hubs. The rotor blades, for example, may be formed integral with or mechanically fastened, welded, brazed, adhered and/or otherwise attached to the respective rotor disk(s) and/or the respective hub(s).

The fan rotor 60 is connected to a geartrain 66, for example, through a fan shaft 68. The geartrain 66 and the LPC rotor 61 are connected to and driven by the LPT rotor 64 through a low speed shaft 69. The HPC rotor 62 is connected to and driven by the HPT rotor 63 through a high speed shaft 70. The engine shafts 68-70 are rotatably supported by a plurality of bearings; e.g., rolling element and/or thrust bearings. Each of these bearings is connected to the engine housing 36 by at least one stationary structure such as, for example, an annular support strut.

During operation, air enters the aircraft propulsion system 20 and its turbine engine 22 through an airflow inlet 72 into the turbine engine 22. This air is directed through the fan section 30 and into a core flowpath 74, the primary flowpath 44 and the secondary flowpath 46. The core flowpath 74 of FIG. 1 extends through the engine core 42 and sequentially through its engine sections 31A-33B from a forward, upstream inlet 76 into the core flowpath 74 to an aft, downstream exhaust 78 from the core flowpath 74. Briefly, the core flowpath inlet 76 may be axially aligned with the primary flowpath inlet 48 and/or the secondary flowpath inlet 52 along the centerline axis 24. The core flowpath exhaust 78 may be axially aft of the primary flowpath inlet 48 and/or the secondary flowpath inlet 52 along the centerline axis 24; however, the present disclosure is not limited to such an exemplary arrangement. The air entering the core flowpath 74 may be referred to as "core air". The air entering the primary flowpath 44 may be referred to as "primary flowpath air", or "primary bypass air". The air entering the secondary flowpath 46 may be referred to as "secondary flowpath air", or "secondary bypass air".

The core air is compressed by the LPC rotor 61 and the HPC rotor 62 and directed into a (e.g., annular) combustion chamber 80 of a (e.g., annular) combustor 82 in the combustor section 32. Fuel is injected by one or more fuel injectors 84 into the combustion chamber 80 and mixed with the compressed core air to provide a fuel-air mixture. This fuel-air mixture is ignited and combustion products thereof flow through and sequentially cause the HPT rotor 63 and the LPT rotor 64 to rotate before being directed out of the aircraft propulsion system 20 and its turbine engine 22 through the core flowpath exhaust 78. The rotation of the HPT rotor 63 and the LPT rotor 64 respectively drive rotation of the HPC rotor 62 and the LPC rotor 61 and, thus, compression of the core air received from the core flowpath inlet 76. The rotation of the LPT rotor 64 also drives rotation of the fan rotor 60. The rotation of the fan rotor 60 propels a stream of the primary flowpath air through the primary flowpath 44 and out of the aircraft propulsion system 20 and its turbine engine 22 through the primary flowpath exhaust 50. The propulsion of the primary flowpath air may account for a majority of thrust generated by the aircraft propulsion system 20 and its turbine engine 22. The rotation of the fan rotor 60 also propels a stream of the secondary flowpath air through the secondary flowpath 46 and out of the aircraft propulsion system 20 and its turbine engine 22 through the secondary flowpath exhaust 54.

The turbine engine 22 of FIG. 1 also includes a heat exchanger 86 for cooling a working fluid of the turbine engine 22. Examples of the working fluid include, but are not limited to, lubricant (e.g., engine oil), coolant, another airflow or fuel. The heat exchanger 86 is arranged within the secondary flowpath 46. The heat exchanger 86 of FIG. 1, for example, is disposed at an intermediate location axially along the secondary flowpath 46 between the secondary flowpath inlet 52 and the secondary flowpath exhaust 54. This heat exchanger 86 extends radially across the secondary flowpath 46, for example, radially between and to the inner wall 56 and the outer wall 58. With this arrangement, at least some or all of the stream of the secondary flowpath air flows through the heat exchanger 86 as that air is directed from the secondary flowpath inlet 52 to the secondary flowpath exhaust 54. As the secondary flowpath air crosses the heat exchanger 86, the heat exchanger 86 transfers heat energy between the working fluid and the secondary flowpath air. Thus, where the secondary flowpath air is cooler than the working fluid, the heat exchanger 86 may cool the working fluid.

The heat exchanger 86 may extend circumferentially about the centerline axis 24 within the secondary flowpath 46. The heat exchanger 86, for example, may be configured with a full-hoop (e.g., annular) geometry or alternatively an arcuate geometry. The heat exchanger 86 may be formed from a plurality of heat exchanger sections. These heat exchanger sections may be arranged circumferentially end-to-end (or slightly spaced) within the secondary flowpath 46. The present disclosure, however, is not limited to such an exemplary heat exchanger arrangement.

Figure 2:
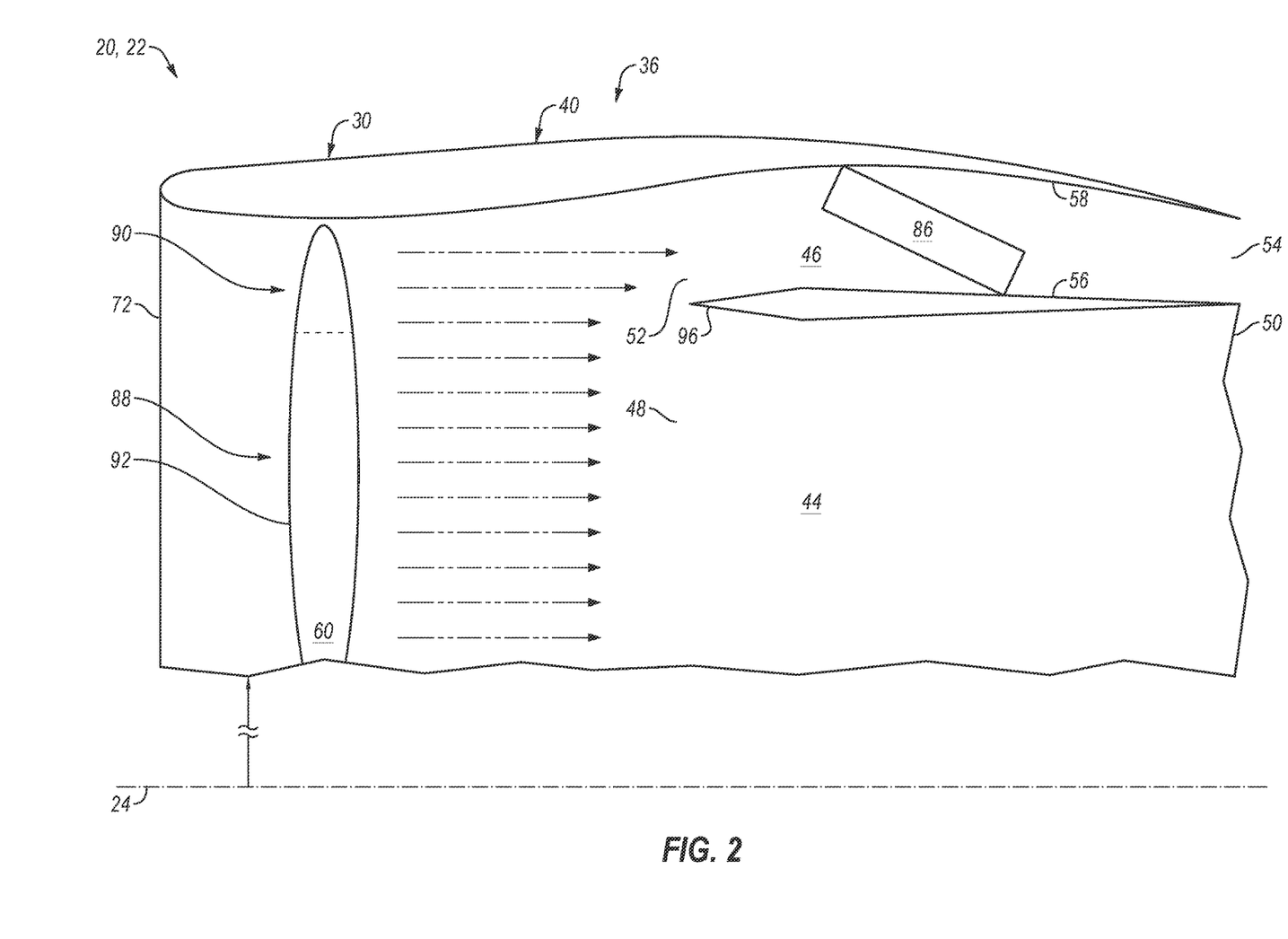
FIG. 2 is a schematic illustration of a portion of the propulsion system with a primary flowpath and a secondary flowpath.

A temperature differential between a temperature of the secondary flowpath air and a temperature of the working fluid may change based on various parameters including, but not limited to, operating conditions (e.g., aircraft altitude, ambient temperature, etc.) and/or engine power setting. In some circumstances, this temperature differential may be relatively small. During such circumstances, there is a benefit to directing the stream of the secondary flowpath air into the secondary flowpath 46 at a relatively high pressure and/or a relatively high velocity. However, increasing a pressure and/or a velocity of the stream of the primary flowpath air may decrease propulsion efficiency of the aircraft propulsion system 20 and its turbine engine 22. Therefore, referring to FIG. 2, the turbine engine 22 of the present disclosure is configured such that (A) the stream of the primary flowpath air entering the primary flowpath 44 is at a primary flowpath pressure and a (e.g., average) primary flowpath velocity and (B) the stream of the secondary flowpath air entering the secondary flowpath 46 is at a secondary flowpath pressure and a (e.g., average) secondary flowpath velocity, where the primary flowpath pressure is different (e.g., less) than the secondary flowpath pressure and the primary flowpath velocity is different (e.g., less) than the secondary flowpath velocity during at least one mode of operation (or during all modes of operation).

To facilitate the pressure and/or velocity differential between the primary flowpath 44 and the secondary flowpath 46, the fan rotor 60 may be configured with a variable fan pressure ratio. A primary (e.g., inner and/or intermediate) portion 88 of the fan rotor 60 of FIG. 2, for example, is configured to provide a first pressure ratio across the fan rotor 60. This primary portion 88 of the fan rotor 60 is configured to direct the stream of the primary flowpath air into the primary flowpath 44 with a first velocity profile. A secondary (e.g., outer) portion 90 of the fan rotor 60 of FIG. 2, on the other hand, is configured to provide a second pressure ratio across the fan rotor 60. This secondary portion 90 of the fan rotor 60 is configured to direct the stream of the secondary flowpath air into the secondary flowpath 46 with a second velocity profile that is different (e.g., greater) than the first velocity profile. The fan rotor 60 may thereby be tailored to direct air into the secondary flowpath 46 at a different (e.g., higher) pressure and/or velocity than air directed into the primary flowpath 44. Various blade parameters of the fan rotor 60 may be tuned (e.g., varied) to provide the fan rotor 60 with its multi-pressure ratio configuration. Examples of these blade parameters include, but are not limited to, a blade exit metal angle (or a blade exit angle) of each fan blade 92 and/or twist of each fan blade 92. For example, the blade exit metal angle and/or the fan blade twist may be varied (e.g., increased) at or near the secondary portion 90 of the fan rotor 60.

Figure 3A:
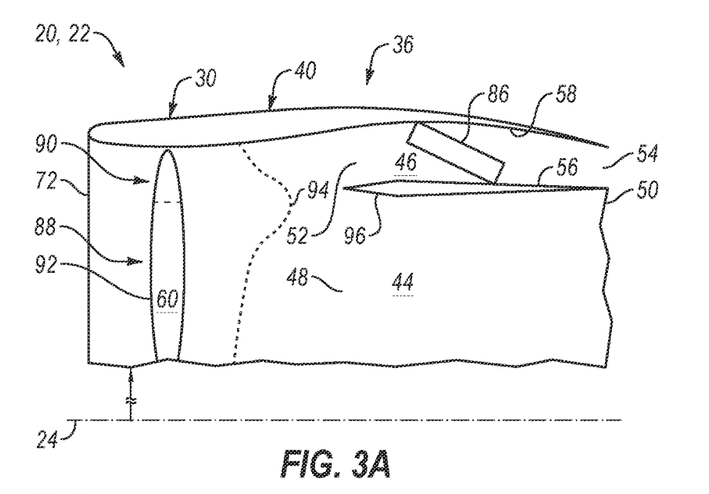
FIGS. 3A and 3B are schematic illustrations of a portion of the propulsion system with various flow velocity profiles.
Figure 3B:
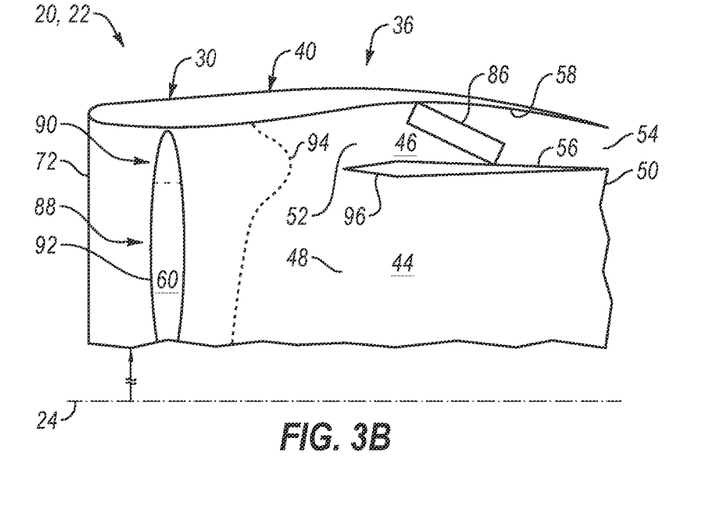

In some embodiments, referring to FIG. 3A, a velocity profile of the air propelled by the fan rotor 60 to the primary flowpath 44 and the secondary flowpath 46 may be tuned to provide a maximum velocity region 94 (or point) radially at a splitter 96 between the primary flowpath inlet 48 and the secondary flowpath inlet 52. In other embodiments, referring to FIG. 3B, the velocity profile of the air propelled by the fan rotor 60 to the primary flowpath 44 and the secondary flowpath 46 may be tuned to provide the maximum velocity region 94 (or point) radially above the splitter 96; e.g., at or along the secondary flowpath inlet 52. The velocity profile, however, is not limited to such exemplary locations.

Figure 4A:
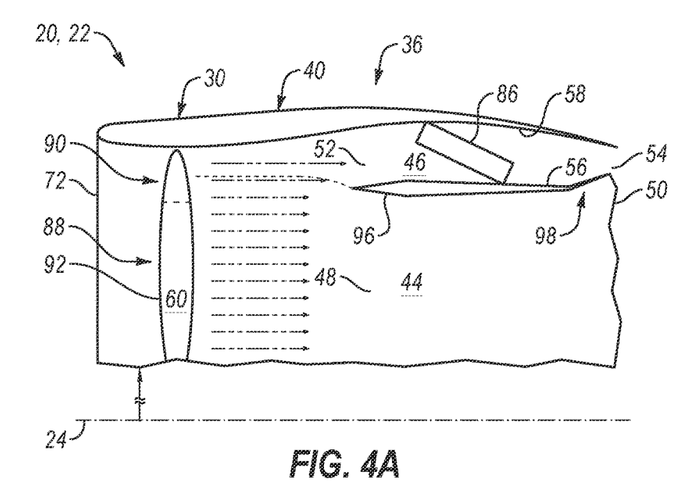
FIGS. 4A and 4B are schematic illustrations of a portion of the propulsion system with a variable area nozzle in various positions.
Figure 4B:
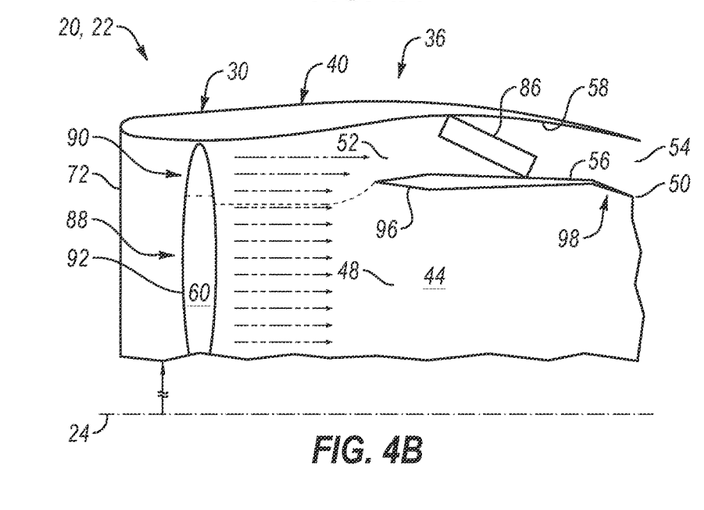

In some embodiments, referring to FIGS. 4A and 4B, the turbine engine 22 may include a variable area nozzle 98 to further or alternatively adjust a pressure ratio and/or a velocity ratio between the primary flowpath air stream and the secondary flowpath air stream. The variable area nozzle 98 of FIGS. 4A and 4B, for example, is configured to form the secondary flowpath exhaust 54. The secondary flowpath 46, in particular, extends (e.g., axially) in the engine housing 36/the turbine engine 22 to the variable area nozzle 98. The variable area nozzle 98 is configured to move between a restricted arrangement (e.g., see FIG. 4A) and an unrestricted arrangement (e.g., see FIG. 4B). In the restricted arrangement of FIG. 4A, a flow area through the variable area nozzle 98/the secondary flowpath exhaust 54 has a restricted value. In the unrestricted arrangement of FIG. 4B, the flow area through the variable area nozzle 98/the secondary flowpath exhaust 54 has an unrestricted value that is greater than the restricted value. By restricting the flow area (see FIG. 4A), the variable area nozzle 98 increases flow resistance through the secondary flowpath 46 and thereby effectively directs additional air propelled by the fan rotor 60 radially downward into the primary flowpath 44. However, by unrestricting the flow area (see FIG. 4B), the variable area nozzle 98 decreases flow resistance through the secondary flowpath 46 and thereby effectively directs additional air propelled by the fan rotor 60 radially upward into the secondary flowpath 46. The variable area nozzle 98 therefore may be used to tune (e.g., increase or decrease) the pressure ratio and/or the velocity ratio between the primary flowpath air stream and the secondary flowpath air stream.

Figure 5A:
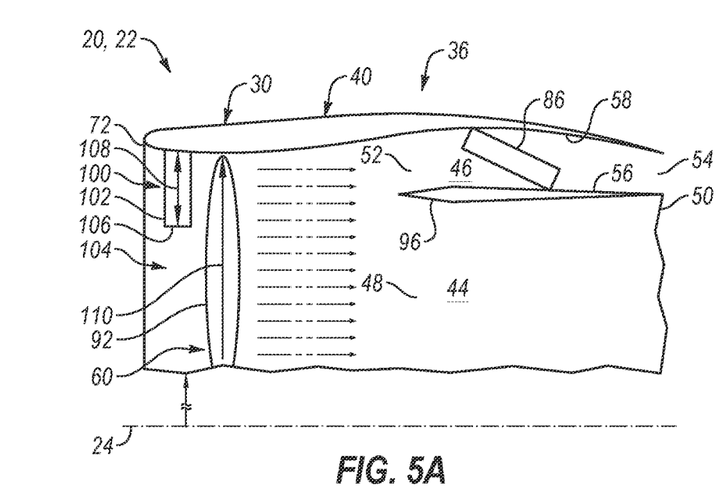
FIGS. 5A and 5B are schematic illustrations of a portion of the propulsion system with a variable vane arrangement in various positions.
Figure 5B:
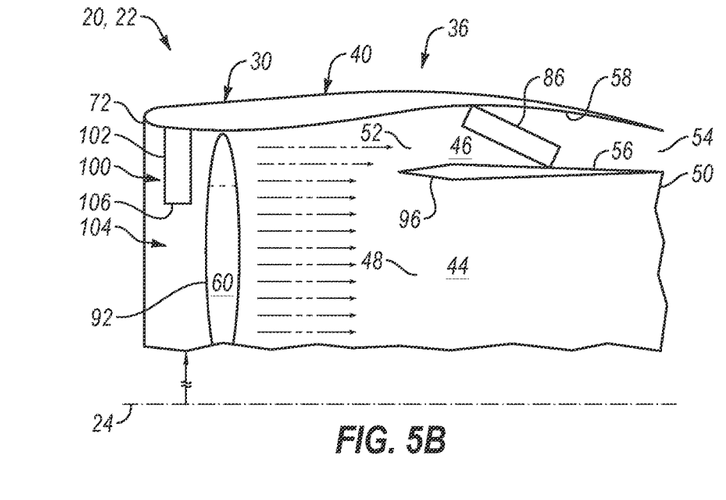

In some embodiments, referring to FIGS. 5A and 5B, the turbine engine 22 may include a variable vane arrangement 100 to further or alternatively adjust the pressure ratio and/or the velocity ratio between the primary flowpath air stream and the secondary flowpath air stream. The variable vane arrangement 100 of FIGS. 5A and 5B, for example, includes a plurality of inlet guide vanes 102 arranged circumferentially about the centerline axis 24 in an array. This array of the inlet guide vanes 102 is disposed within an inlet duct 104 of the turbine engine 22 upstream of the fan rotor 60. Each of the inlet guide vanes 102 projects radially inward (in a direction towards the centerline axis 24) to a respective distal end 106, where the distal end 106 may be radially aligned with or inward of the splitter 96. Each inlet guide vane 102 of FIGS. 5A and 5B may thereby radially overlap at least a portion of or an entirety of the secondary flowpath inlet 52. Each inlet guide vane 102 may also partially radially overlap a radial outer portion of the primary flowpath inlet 48. Each inlet guide vane 102 of FIG. 5A has a radially extending span 108. Each fan blade 92 has a radially extending span 110, where the blade span 110 is greater than the vane span 108. The blade span 110, for example, may be at least two times (2×), three times (3×) or four times (4×) the vane span 108.

Figure 6A:
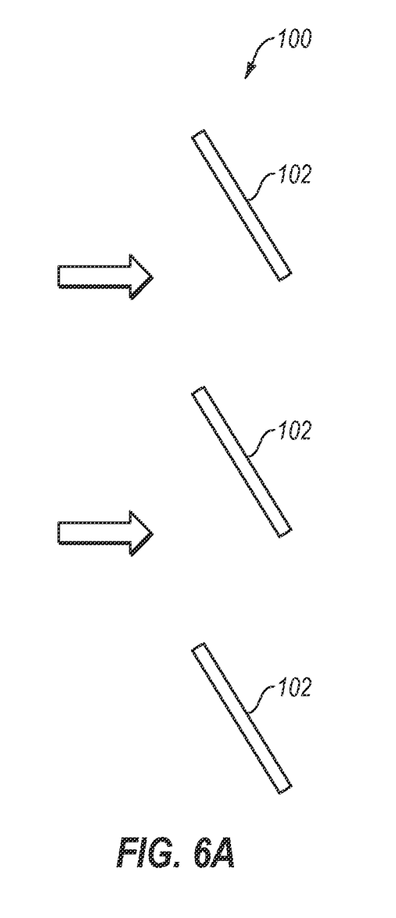
FIGS. 6A and 6B are schematic illustrations of a portion of the variable vane arrangement with its vanes in various positions.
Figure 6B:
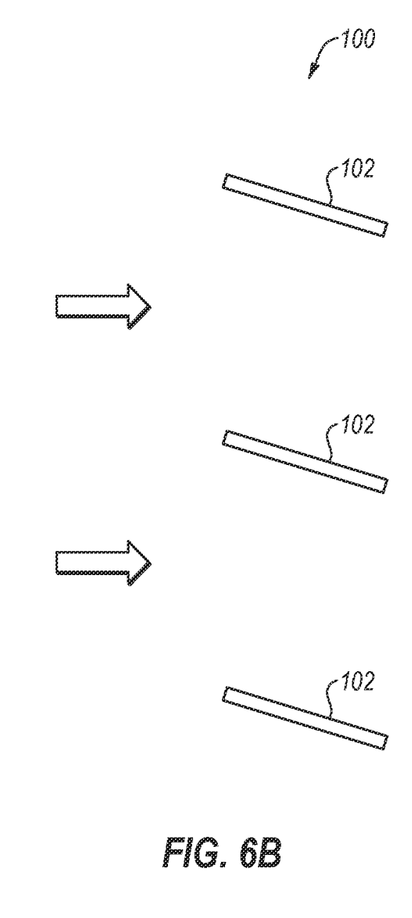
Figure 7A:
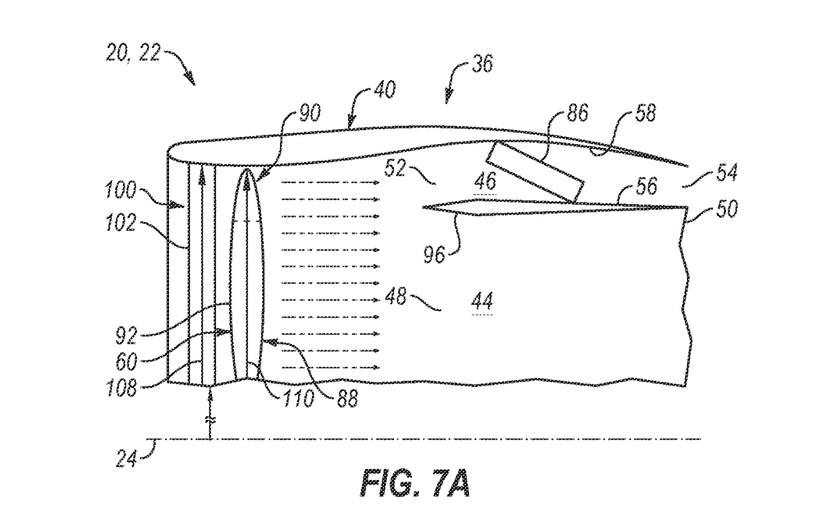
FIGS. 7A and 7B are schematic illustrations of a portion of the propulsion system with another variable vane arrangement in various positions.
Figure 7B:
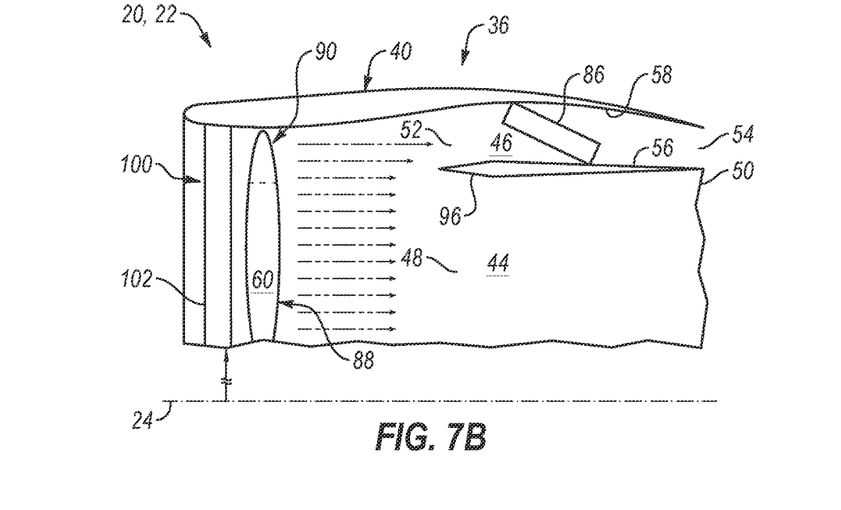

Referring to FIGS. 6A and 6B, each inlet guide vane 102 may be configured to move (e.g., pivot) about an axis between a first (e.g., open, unrestricted) position and a second (e.g., closed, restricted) position. In the restricted position of FIGS. 5A and 6A, a flow area through the variable vane arrangement 100 has a restricted value. In the unrestricted arrangement of FIGS. 5B and 6B, the flow area through the variable vane arrangement 100 has an unrestricted value that is greater than the restricted value. By restricting the flow area (see FIGS. 5A and 6A), the variable vane arrangement 100 increases flow resistance upstream of and along the secondary portion 90 of the fan rotor 60 thereby effectively directing additional air towards the primary portion 88 of the fan rotor 60 and, thus, the primary flowpath 44. However, by unrestricting the flow area (see FIGS. 5B and 6B), the variable vane arrangement 100 decreases flow resistance upstream of and along the secondary portion 90 of the fan rotor 60 thereby effectively directing additional air towards the secondary portion 90 of the fan rotor 60 and, thus, the secondary flowpath 46. The variable vane arrangement 100 therefore may be used to tune (e.g., increase or decrease) the pressure ratio and/or the velocity ratio between the primary flowpath air stream and the secondary flowpath air stream. Of course, it is contemplated each inlet guide vane 102 may also move to one or more intermediate positions (e.g., partially open/closed positions) between the first position and the second position.

Figure 8:
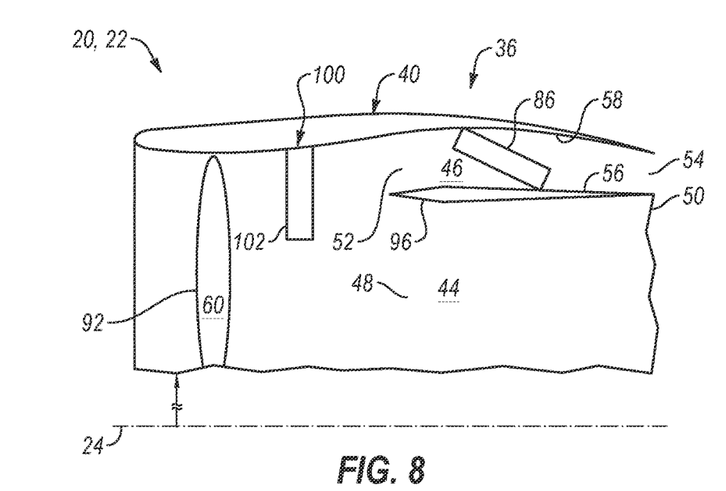
FIGS. 8-10 are schematic illustrations of a portion of the propulsion system with other variable vane arrangements.
Figure 9:
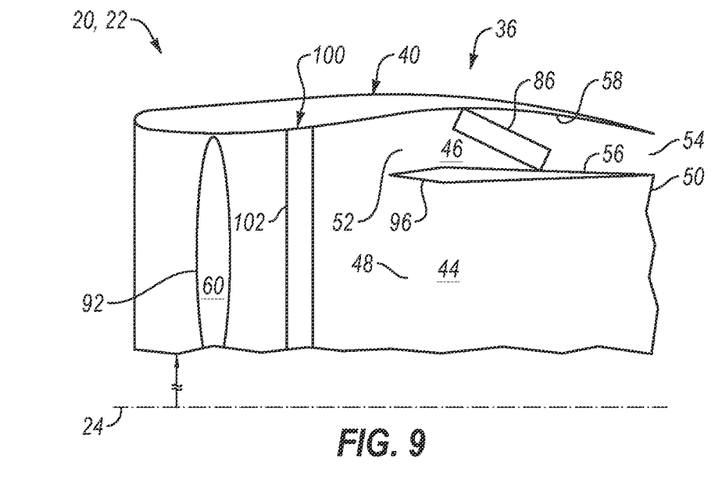

In the embodiment of FIGS. 5A and 5B, the variable vane arrangement 100 is configured to guide flow into the secondary portion 90 of the fan rotor 60 and, thus, the secondary flowpath 46. In other embodiments however, referring to FIGS. 7A and 7B, the variable vane arrangement 100 may be configured to guide flow into the primary portion 88 and the secondary portion 90 of the fan rotor 60 and, thus, the primary flowpath 44 and the secondary flowpath 46. The blade span 110 of FIG. 7A, for example, may be equal to or within five or ten percent (5-10%) of the vane span 108. Moreover, while the variable vane arrangement 100 of FIGS. 5A and 5B, 7A and 7B are positioned upstream of the fan rotor 60, a similar arrangement may be provided downstream of the fan rotor 60 and upstream of the secondary flowpath inlet 52. For example, referring to FIGS. 8 and 9, the variable vane arrangement 100 may alternatively be configured to condition the air propelled by the fan rotor 60 towards the respective flowpath 44, 46. Here too, the vanes 102 (e.g., exit guide vanes) may be moved (e.g., see FIGS. 6A and 6B) to tune (e.g., increase or decrease) the pressure ratio and/or the velocity ratio between the primary flowpath air stream and the secondary flowpath air stream.

Figure 10:
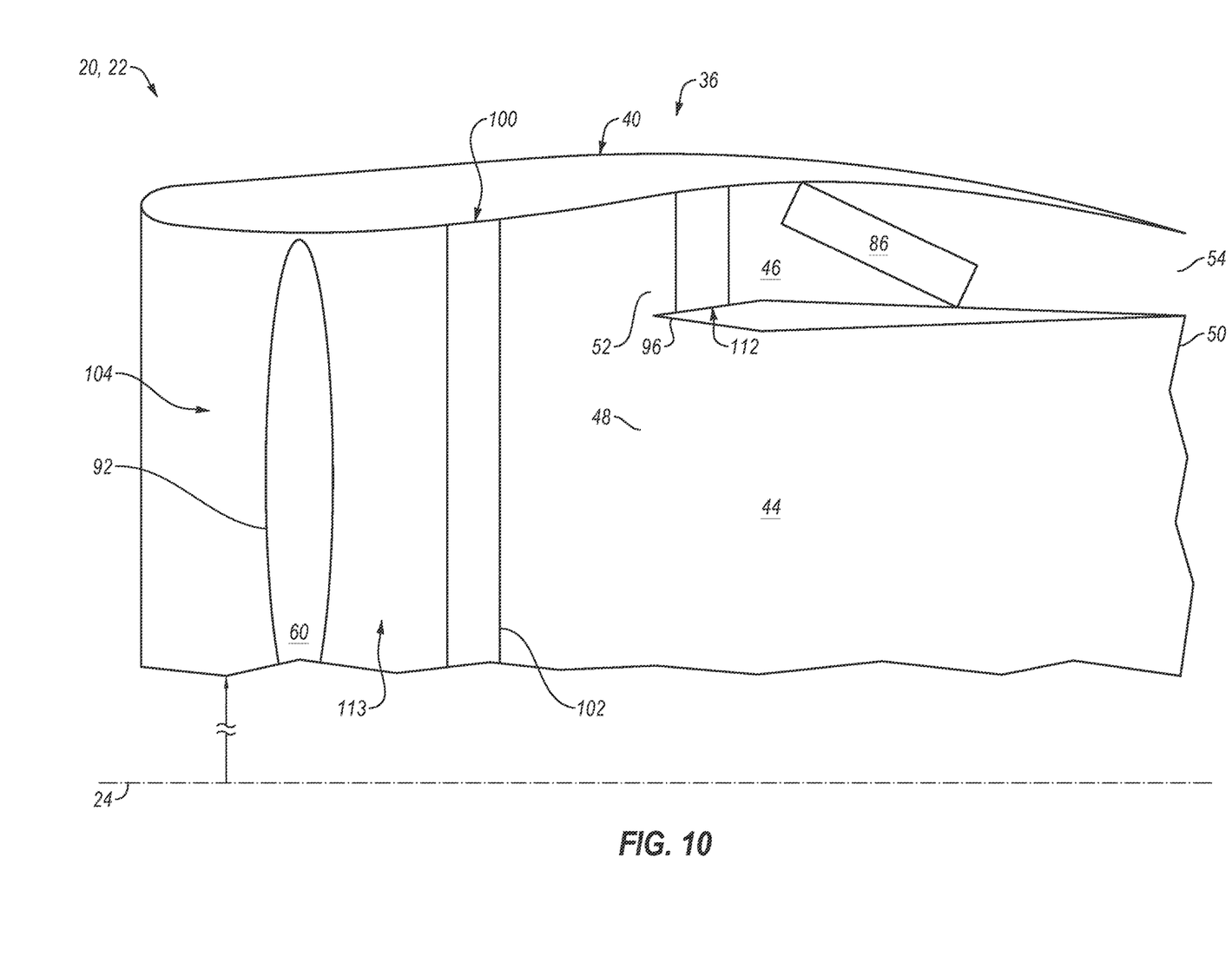

In some embodiments, referring to FIG. 10, the secondary flowpath 46 may also or alternatively be provided with a variable vane arrangement 112. This variable vane arrangement 112 may operate similar to the above variable vane arrangements 100 to tune (e.g., increase or decrease) the pressure ratio and/or the velocity ratio between the primary flowpath air stream and the secondary flowpath air stream. However, rather than being arranged in the inlet duct 104 or a fan duct 113, the variable vane arrangement of FIG. 10 is arranged within the secondary flowpath 46 upstream of the heat exchanger 86. The variable vane arrangement 112 of FIG. 10, for example, is disposed at (e.g., on, adjacent or proximate) the secondary flowpath inlet 52.

Figure 11:
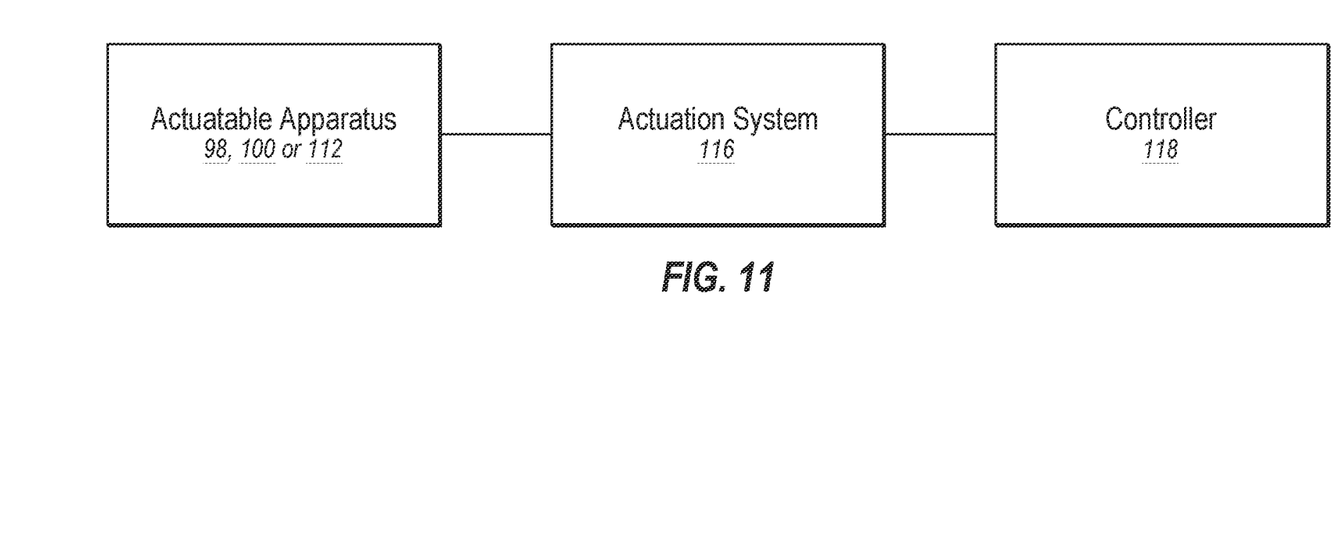
FIG. 11 is a schematic illustration of an actuatable apparatus of the propulsion system arranged with an actuation system and a controller.

Referring to FIG. 11, each actuatable apparatus (e.g., 98, 100, 112) and/or one or more of its elements may be respectively actuated by an actuation system 116 controlled by an electronic controller 118. This controller 118 is configured to provide a control signal to the actuation system 116 to move the actuatable apparatus between various arrangements (e.g., the restricted and unrestricted arrangement) to tune the pressure ratio and/or the velocity ratio between the primary flowpath air stream and the secondary flowpath air stream as described above. The controller 118 may provide this control signal based on one or more operational parameters. Examples of these operational parameters include, but are not limited to, a heat load to be rejected by the heat exchanger 86, an engine power setting, ambient conditions, etc. For example, the controller 118 may estimate a heat transfer parameter, and signal the actuation system 116 to adjust the actuatable apparatus to affect boundary conditions of the heat exchanger 86 to achieve the heat transfer parameter.

In some embodiments, referring to FIG. 1, the secondary flowpath 46 may be located radially outboard of, extend axially along (e.g., axially overlap) and/or extend circumferentially about (e.g., circumscribe) the primary flowpath 44. In other embodiments, referring to FIGS. 12 and 13, the primary flowpath 44 may alternatively be located radially outboard of, extend axially along (e.g., axially overlap) and/or extend circumferentially about (e.g., circumscribe) the secondary flowpath 46.

Figure 12:
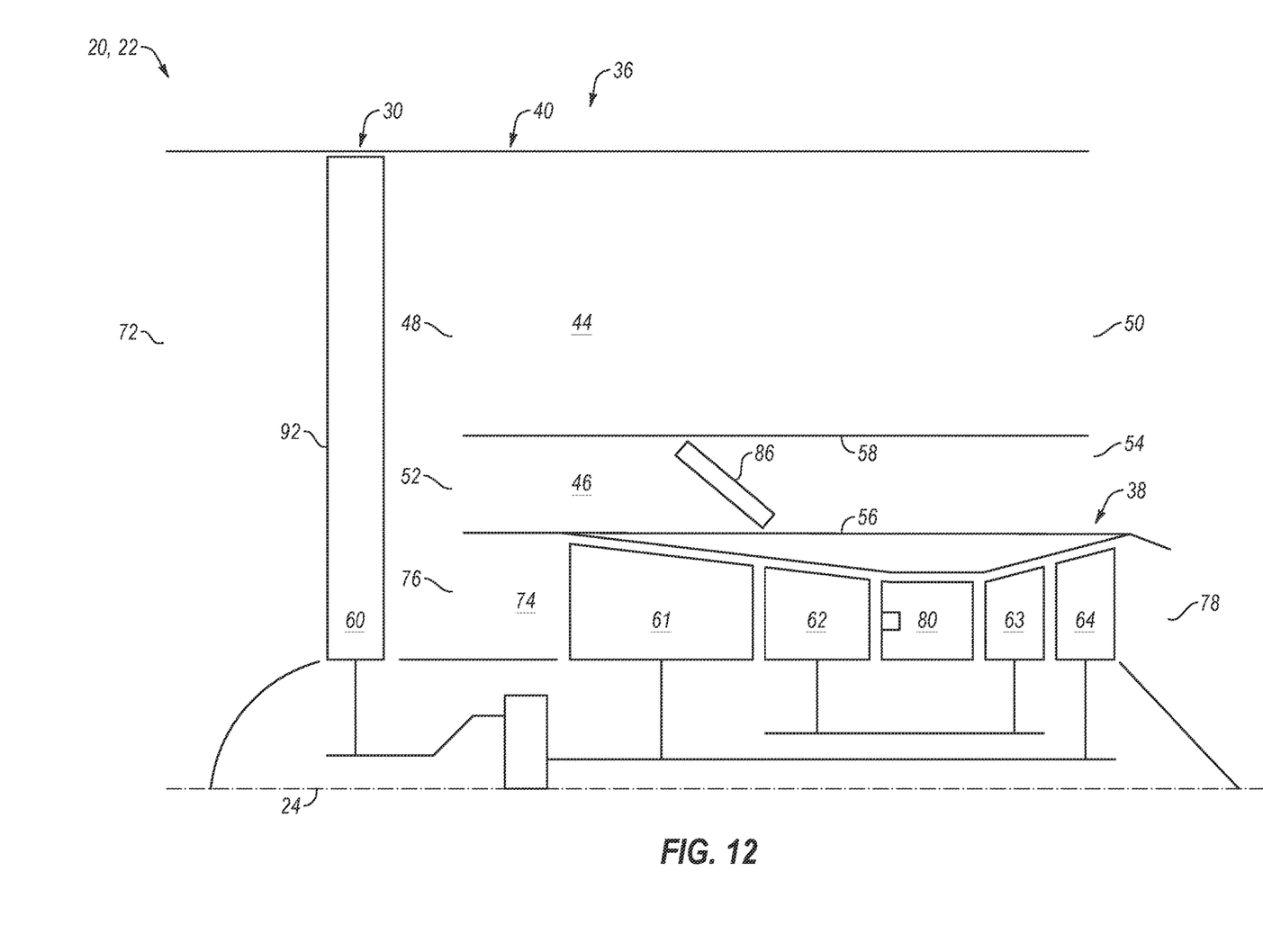
FIGS. 12 and 13 are partial schematic illustrations of the propulsion system with various alternative primary and secondary flowpath arrangements.
Figure 13:
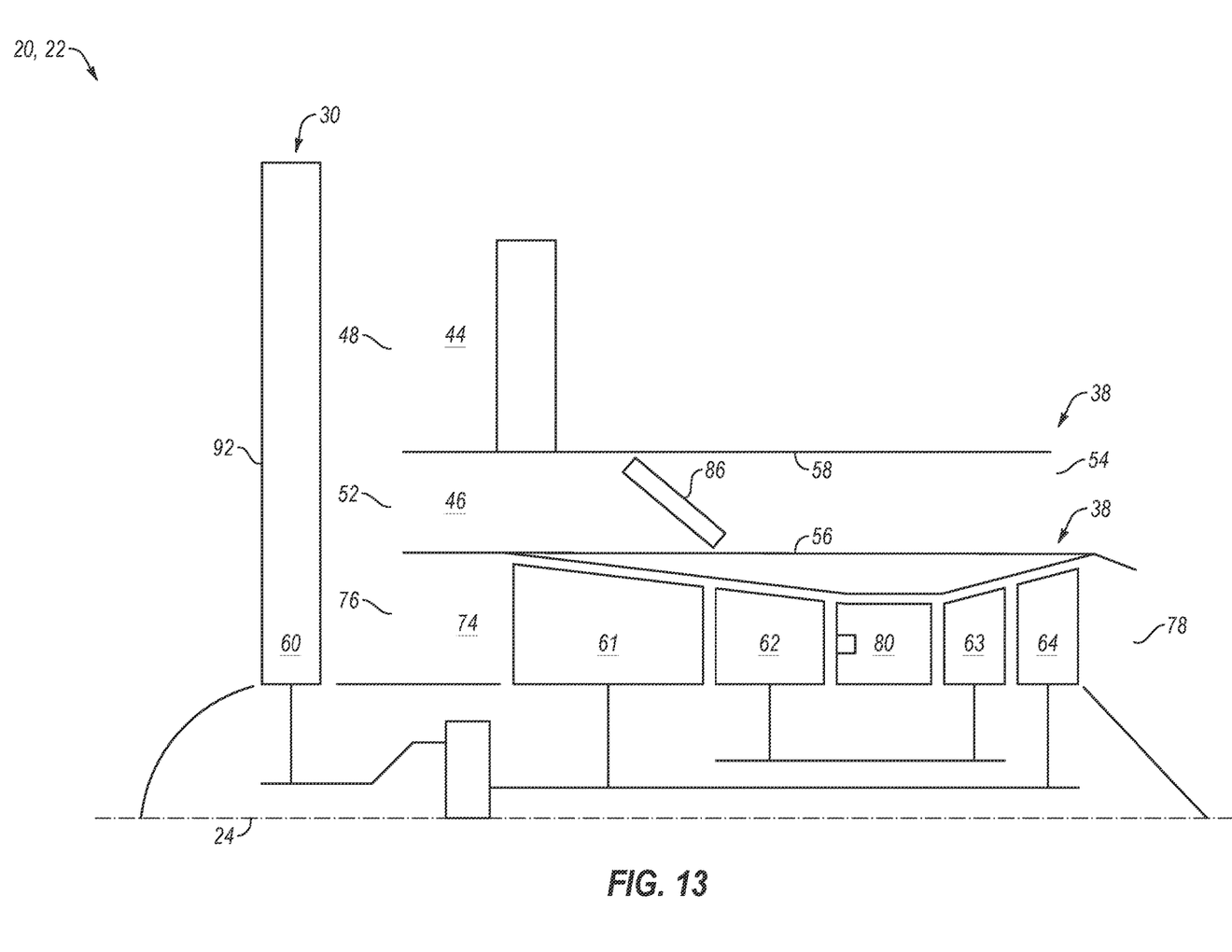

In some embodiments, referring to FIGS. 1 and 12, the primary flowpath 44 and the secondary flowpath 46 may each be disposed in/extend in the aircraft propulsion system 20 and its turbine engine 22/its engine housing 36. In other embodiments, referring to FIG. 13, the primary flowpath 44 may alternatively be disposed (e.g., radially) outside of the aircraft propulsion system 20 and its turbine engine 22/its engine housing 36. The turbine engine 22, for example, may alternatively be configured as an open rotor engine. Here, the rotor 60 is configured as an open (e.g., un-ducted) propulsor rotor and the blades 92 are configured as open (e.g., un-ducted) blades.

In some embodiments, the fan rotor 60 may be configured with a variable fan pressure ratio as described above. This may be provided in addition to the various other techniques for tuning the pressure ratio and/or the velocity ratio between the primary flowpath air stream and the secondary flowpath air stream; e.g., see FIGS. 4A, 4B, 5A, 5B, 7A, 7B and 8-10. In other embodiments, the fan rotor 60 (or open rotor) may be configured with a (e.g., substantially) uniform fan pressure ratio. In such embodiments, the various other techniques may be (e.g., solely) used for tuning the pressure ratio and/or the velocity ratio between the primary flowpath air stream and the secondary flowpath air stream; e.g., see FIGS. 4A, 4B, 5A, 5B, 7A, 7B and 8-10.

While the vanes (e.g., 102) in the variable vane arrangements (e.g., 100, 112) described above are variable vanes, the present disclosure is not limited to such an exemplary arrangement. One or more of the vanes, for example, may alternatively be configured as a fixed vane. With such an arrangement, a pressure ratio across the vane arrangement may be tuned similar to the variable fan pressure ratio described above.

The aircraft propulsion system 20 may include various turbine engines other than the one described above. The aircraft propulsion system 20, for example, may include a geared turbine engine where a geartrain connects one or more shafts to one or more rotors in a fan section, a compressor section and/or any other engine section. Alternatively, the aircraft propulsion system 20 may include a turbine engine configured without a geartrain; e.g., a direct drive turbine engine. The turbine engine may be configured with a single spool, with two spools (e.g., see FIG. 1), or with more than two spools. The turbine engine may be configured as a turbofan engine, a turbojet engine, a turboprop engine, a turboshaft engine, a propfan engine, a pusher fan engine or any other type of turbine engine. The present disclosure therefore is not limited to any particular types or configurations of turbine engines.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A propulsion system for an aircraft, comprising:
  a turbine engine including a propulsor rotor, an engine core and a heat exchanger;
  the propulsor rotor configured to rotate about an axis and direct a first air stream along a primary flowpath that bypasses the engine core, and the propulsor rotor configured to direct a second air stream along a secondary flowpath with a geometry extending at least eighty degrees about the axis, the secondary flowpath disposed radially outboard of the primary flowpath and extending circumferentially about the primary flowpath, wherein the turbine engine is configured such that the first air stream enters the primary flowpath at a first pressure and the second air stream enters the secondary flowpath at a second pressure that is greater than the first pressure;
  the engine core configured to drive rotation of the propulsor rotor; and
  the heat exchanger disposed within the secondary flowpath,
  wherein the turbine engine further includes one or both of a variable area nozzle and/or a plurality of guide vanes arranged circumferentially about the axis in an array and located upstream of a splitter between the primary flowpath and the secondary flowpath, the plurality of guide vanes radially overlapping the splitter.

2. The propulsion system of claim 1, wherein the secondary flowpath bypasses the engine core.

3. The propulsion system of claim 1, wherein an entrance to the primary flowpath and an entrance to the secondary flowpath are axially aligned along the axis.

4. The propulsion system of claim 1, wherein the primary flowpath and the secondary flowpath each extend in the turbine engine.

5. The propulsion system of claim 1, wherein
the primary flowpath extends outside of the turbine engine; and
the secondary flowpath extends in the turbine engine.

6. The propulsion system of claim 1, wherein the turbine engine is configured such that the first air stream enters the primary flowpath at a first velocity and the second air stream enters the secondary flowpath at a second velocity that is greater than the first velocity.

7. The propulsion system of claim 1, wherein
a first radial portion of the propulsor rotor is configured to provide a first pressure ratio across the propulsor rotor, and the first radial portion of the propulsor rotor is configured to direct the first air stream into the primary flowpath; and
a second radial portion of the propulsor rotor is configured to provide a second pressure ratio across the propulsor rotor that is different than the first pressure ratio, and the second radial portion of the propulsor rotor is configured to direct the second air stream into the secondary flowpath.

8. The propulsion system of claim 1, wherein
the turbine engine includes the variable area nozzle;
the secondary flowpath extends in the turbine engine to the variable area nozzle; and
movement of the variable area nozzle changes a ratio between the first pressure and the second pressure.

9. The propulsion system of claim 1, wherein
the turbine engine includes the plurality of guide vanes arranged circumferentially about the axis in an array;
the plurality of guide vanes are upstream of the propulsor rotor; and
the plurality of guide vanes are configured to guide air to at least a radial portion of the propulsor rotor that directs the second air stream into the secondary flowpath.

10. The propulsion system of claim 9, wherein
a first of the plurality of guide vanes has a vane span; and
the propulsor rotor comprises a propulsor blade with a blade span that is at least two times larger than the vane span.

11. The propulsion system of claim 9, wherein the plurality of guide vanes are further configured to guide the air to a radial portion of the propulsor rotor that directs the first air stream into the primary flowpath.

12. The propulsion system of claim 9, wherein
a first of the plurality of guide vanes comprises a first variable vane; and
movement of the first variable vane changes a ratio between the first pressure and the second pressure.

13. The propulsion system of claim 1, wherein
the turbine engine includes the plurality of guide vanes arranged circumferentially about the axis in an array;
the plurality of guide vanes are downstream of the propulsor rotor;
the plurality of guide vanes are configured to guide the first air stream into the primary flowpath; and
the plurality of guide vanes are configured to guide the second air stream into the secondary flowpath.

14. The propulsion system of claim 13, wherein
a first of the plurality of guide vanes comprises a first variable vane; and
movement of the first variable vane changes a ratio between the first pressure and the second pressure.

15. The propulsion system of claim 1, wherein
the turbine engine further includes a plurality of secondary flowpath guide vanes arranged circumferentially about the axis in an array; and
the plurality of secondary flowpath guide vanes are disposed within the secondary flowpath upstream of the heat exchanger.

16. A propulsion system for an aircraft, comprising:
a turbine engine including a propulsor rotor, a variable vane arrangement, an engine core and a heat exchanger;
the propulsor rotor configured to direct a first air stream along a primary flowpath that bypasses the engine core, and the propulsor rotor configured to direct a second air stream along a secondary flowpath that bypasses the engine core, wherein the secondary flowpath is radially outboard of the primary flowpath;
the variable vane arrangement configured to change a pressure ratio between a first pressure of the first air stream entering the primary flowpath to a second pressure of the second air stream entering the secondary flowpath;
the turbine engine configured to drive rotation of the propulsor rotor; and
the heat exchanger disposed within the secondary flowpath.

* * * * *